United States Patent
Ambe et al.

(10) Patent No.: US 7,277,438 B2
(45) Date of Patent: Oct. 2, 2007

(54) FAST FLEXIBLE RANGE CHECKING

(75) Inventors: Shekhar Ambe, San Jose, CA (US); Sandeep Relan, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1225 days.

(21) Appl. No.: 10/191,529

(22) Filed: Jul. 10, 2002

(65) Prior Publication Data

US 2003/0174704 A1     Sep. 18, 2003

Related U.S. Application Data

(60) Provisional application No. 60/364,599, filed on Mar. 18, 2002.

(51) Int. Cl.
 *H04L 12/56* (2006.01)
(52) U.S. Cl. ............... 370/392; 370/401; 713/154
(58) Field of Classification Search ............... 713/154; 370/392, 401
See application file for complete search history.

(56) References Cited

U.S. PATENT DOCUMENTS

| | | | |
|---|---|---|---|
| 5,898,687 A | 4/1999 | Harriman et al. | |
| 5,951,651 A | 9/1999 | Lakshman et al. | |
| 6,046,979 A * | 4/2000 | Bauman | 370/229 |
| 6,173,384 B1 | 1/2001 | Weaver | |
| 6,289,013 B1 | 9/2001 | Lakshman et al. | |
| 6,781,961 B1 * | 8/2004 | Gunsay | 370/255 |
| 7,039,641 B2 * | 5/2006 | Woo | 707/100 |
| 2003/0231630 A1 * | 12/2003 | Messenger | 370/392 |
| 2004/0213224 A1 * | 10/2004 | Goudreau | 370/389 |

FOREIGN PATENT DOCUMENTS

| | | |
|---|---|---|
| EP | 0 658 837 A2 | 6/1995 |
| EP | 0 993 162 A2 | 4/2000 |
| WO | WO 00/60793 | 10/2000 |

\* cited by examiner

*Primary Examiner*—Brian Nguyen
(74) *Attorney, Agent, or Firm*—Squire, Sanders & Dempsey L.L.P.

(57) ABSTRACT

A network component for processing a packet can include at least one first storage unit configured to store a packet field value within the packet, at least one second storage unit configured to store at least one set of a plurality of range values, and an action implementation unit configured to implement at least one action when the packet field value is within the plurality of range values.

25 Claims, 6 Drawing Sheets

FAST FLEXIBLE RANGE CHECKING

CROSS-REFERENCE TO RELATED APPLICATIONS

This application claims priority of U.S. Provisional Patent Application Ser. No. 60/364,599, filed Mar. 18, 2002. The contents of the provisional application is hereby incorporated by reference.

BACKGROUND OF THE INVENTION

1. Field of the Invention

The present invention relates to a method and an apparatus for high performance packet filtering in a communication network environment such as token ring, ATM, Ethernet, Fast Ethernet, Gigabit Ethernet and 10 Gigabit Ethernet or any other networking environment. In particular, the present invention relates to a packet filter and a method for filtering a packet that can be implemented in a network component, which may include discrete devices or which may be implemented on a semiconductor substrate such as a silicon chip.

2. Description of the Related Art

In networking applications, an incoming packet enters an ingress port of a network component, such as a switch. The network component processes the incoming packet and directs it to an egress port. In processing the incoming packet, the network component can examine the incoming packet on the ingress side, and can determine addressing and routing information to enhance network performance.

The network component can apply various addressing and processing logic to the incoming packet, when examining the incoming packet on the ingress side therein. As the demand for higher speed and lower cost network components increases, so does the demand for an innovative system to meet such demand. Accordingly, a fast and flexible processing logic for a network component is important since it can benefit the communication network environment.

SUMMARY OF THE INVENTION

One example of the present invention can include a method of processing a packet in a communication network. The method can include the steps of determining at least one packet field value within the packet, and identifying at least one set of a plurality of range values. The method can also include the steps of comparing the at least one packet field value with the at least one set of the plurality of range values, and implementing at least one action when the at least one packet field value is within the at least one set of the plurality of range values.

In another example, the present invention can relate to a network component for processing a packet. The network component can have at least one first storage unit configured to store a packet field value within the packet, at least one second storage unit configured to store at least one set of a plurality of range values, and an action implementation unit configured to implement at least one action when the packet field value is within the at least one set of the plurality of range values.

Furthermore, another example of the present invention can provide a system for processing a packet in a communication network. The system can have a means for determining at least one packet field value within the packet, and a means for identifying at least one set of a plurality of range values. Also, the system can have a means for comparing the at least one packet field value with the at least one set of the plurality of range values, and a means for implementing at least one action when the at least one packet field value is within the at least one set of the plurality of range values.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

Figure 1:
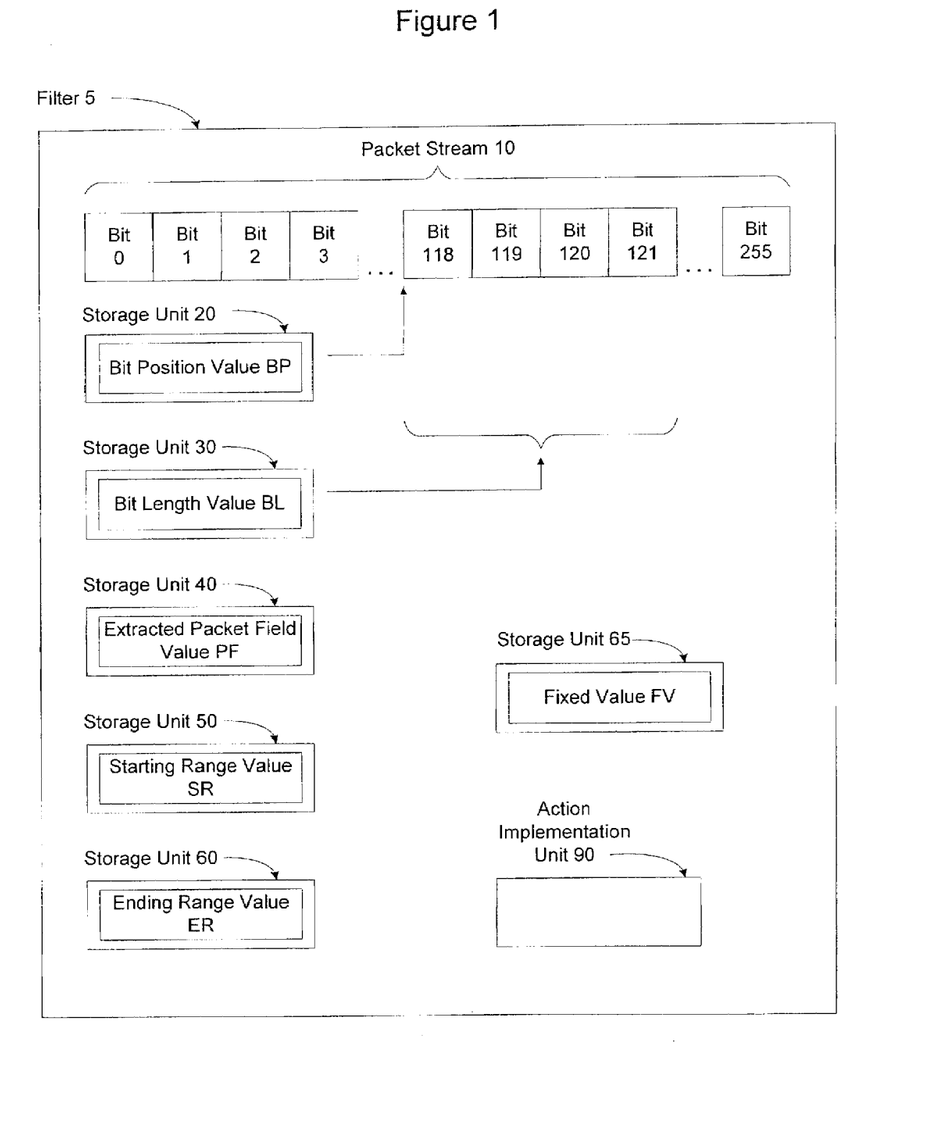
FIG. 1 illustrates one example of a configuration for filtering a packet according to the present invention.

FIG. 1 illustrates one example of a hardware configuration that can perform packet filtering based on fast flexible range checking, in accordance with the present invention. The performance of packet filtering can also be referred to as packet classification. Therefore, the hardware configurations and examples provided herein can also perform packet classification.

In addition, the hardware configuration of FIG. 1 can be in an integrated, modular and single chip solution, and therefore can be embodied on a semiconductor substrate, such as silicon. Alternatively, the hardware configuration of FIG. 1 can be a plurality of discrete components on a circuit board.

FIG. 1 shows a filter 5 that can have at least one packet stream 10, and a plurality of storage units 20, 30, 40, 50 and 60. The packet stream 10, for example, can comprise of 256 bits wherein each bit represents a bit value. It is noted that although the packet stream 10 is provided in FIG. 1, filter 5 can process data in any data format, including but not limited to a data packet, a data frame, or a data cell.

Filter 5 as shown in FIG. 1 can include at least five storage units 20, 30, 40, 50 and 60 wherein each storage unit 20, 30, 40, 50 and 60 can be any memory storage unit, such as a register. Each storage unit 20, 30, 40, 50 and 60 can store programmable values or information therein, and can be of any width or bit length.

Storage unit 20 of FIG. 1 can be a register for storing a position value in a bit stream. The position value in the bit stream is termed as bit position value BP and can be a programmable value that can identify or represent a predetermined bit position within a packet stream 10. Therefore, the bit position value BP can be a value that represents the starting bit position of a particular packet field or a particular packet section within a packet stream 10, to be extracted therefrom. For example, the bit position value BP can be a predetermined programmable binary value equivalent to decimal value 118 which can identify or represent the starting bit position 118 within the 256 bits of packet stream 10.

In addition, storage unit 30 of FIG. 1 can also be a register for storing a bit length value BL. The bit length value BL can be a programmable value that identifies or represent a predetermined bit length of a packet field within a packet stream 10. In other words, the bit length value BL represents a number of bits to be extracted from a packet stream 10. The bit length value BL can be any value, such as from zero to the value required to indicate the maximum number of bits in the packet stream 10. In other words, the bit length value BL can be a value that represents a number of bits from the starting bit position of a packet field to be extracted from a packet stream 10. For example, the bit length value BL can be a predetermined programmable binary value equivalent to decimal value 4. A bit length value BL of 4 can identify or represent a number of bits from the starting bit position 118 within a packet stream 10, for extraction. As such, a bit position value BP of 118, and a bit length value BL of 4 can extract a packet field of bits 118, 119, 120 and 121 within a packet stream 10.

Storage unit 40 of FIG. 1 can be a register for storing a temporary value or information, such as an extracted packet field value PF. The extracted packet field value PF can be a binary value or can be in any value format. In addition, the extracted packet field value PF can be a value identifying or representing the value associated with a packet field extracted from a packet stream 10. For instance, the storage unit 20 can store a bit position value BP which represents a starting bit position within a packet stream 10. Also, the storage unit 30 can store a bit length value BL, which can represent a number of bits with respect to a packet field to be extracted from the packet stream 10. Accordingly, the BP and BL values or information stored in storage units 20 and 30, respectively, can identify a starting bit position and an ending position of a packet field to be extracted from the packet stream 10. In other words, the bit position BP identifies the starting bit position of a packet field within a packet stream 10. Therefore, the ending position of the field packet can be the sum of the bit position value BP and the bit length value BL. Once the starting bit position and the ending position are identified, the packet field can be extracted from the packet stream 10. Once the packet field is extracted, an extracted packet field value PF can be determined, and the extracted packet field value PF can thereafter be stored in storage unit 40.

Further shown in FIG. 1 is a storage unit 50 configured to store one range value out of a plurality of range values. For example, the storage unit 50 can store a starting range value SR out of a plurality of range values. The storage unit 50 can be a register for storing a starting range value SR. The starting range value SR can be a binary value or a value of any format. Furthermore, the starting range value SR can be a programmable value that can identify or represent a predetermined lower boundary value of a range of values. Therefore, the starting range value SR can identify or represent a lower boundary value of a range of values that the extracted packet field value PF can be compared with or checked against.

Similarly shown in FIG. 1 is a storage unit 60 configured to store another range value out of a plurality of range values. For example, the storage unit 60 can store an ending range value ER out of a plurality of range values. The storage unit 60 can also be a register for storing an ending range value ER. Like the starting range value SR, the ending range value ER can be a binary value or a value of any format. Furthermore, the ending range value ER can be a programmable value that can identify or represent a predetermined upper boundary value of a range of values. Therefore, the ending range value ER can identify or represent an upper boundary value of a range of values that the extracted packet field value PF can be compared with or checked against.

Accordingly, the storage unit 50 can store a starting range value SR which can specify or represent the lower boundary value of a plurality of range values, and the storage unit 60 can store an ending range value ER which can specify or represent the upper boundary value of the plurality of range values. In other words, the starting range value SR and the ending range value ER can identify or set a lower boundary and an upper boundary for a particular range of values. Once the boundaries of the range of values are identified, an extracted packet field value PF stored in the storage unit 40 can be compared with or checked against the range of values established by the starting range value SR and the ending range value ER.

Filter 5 as shown in FIG. 1 can also include a storage unit 65 wherein the storage unit 65 can be any memory storage unit, such as a register. The storage unit 65 can store at least a programmable value or information therein, and can be of any width or bit length. In another example of the present invention, the storage unit 65 can store a predetermined programmable fixed value FV, wherein the fixed value FV can be any value. According, the present example can also extract a packet field value PF stored in the storage unit 40 and can compare it with or check it against the fixed value FV to determine if there is a match. In other words, once a packet field value PF is determined, rather than or in addition to comparing the packet field value PF to a range of values established by the starting range value SR and the ending range value ER, the present example can identify a fixed value FV within storage unit 65 and can compare the packet field value PF to the identified fixed value FV. Upon comparing the packet field value PF with the fixed value FV, the present example can determine whether the packet field value PF is equal to the fixed value FV or whether there is a match between the packet field value PF and the fixed value FV. It is noted that the present invention can separately compare a packet field value PF with a range of values, or can separately compare a packet field value PF with a fixed value FV, or a combination thereof.

Figure 2:
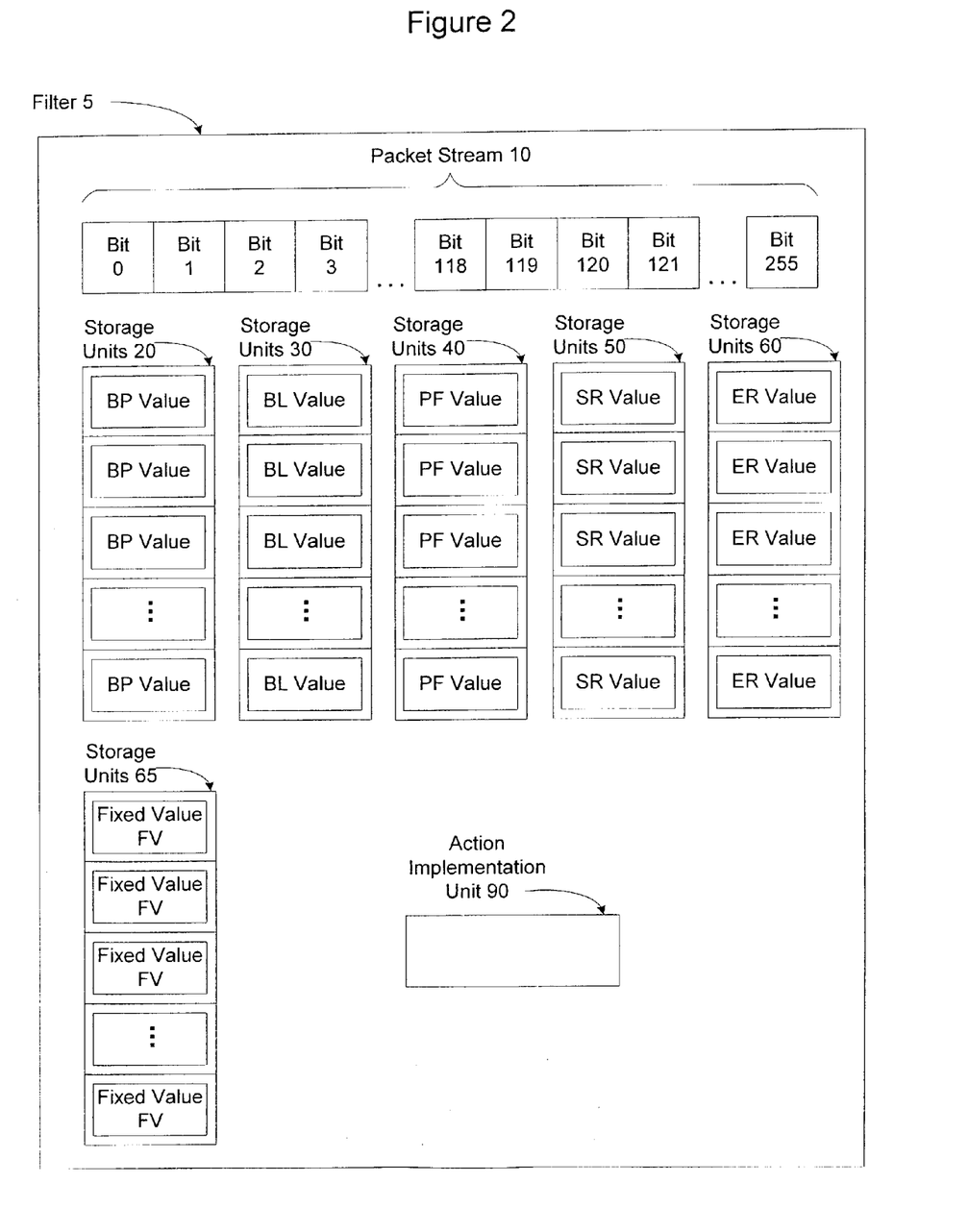
FIG. 2 illustrates another example of a configuration for filtering a packet according to the present invention.

FIG. 2 shows another example of a hardware configuration that can perform packet filtering based on fast flexible range checking, in accordance with the present invention. The hardware configuration of FIG. 2 can be in an integrated, modular and single chip solution, and therefore can be embodied on a semiconductor substrate, such as silicon. Alternatively, the hardware configuration of FIG. 2 can be a plurality of discrete components on a circuit board.

FIG. 2 shows a filter 5 that can have at least one packet stream 10, and a plurality of storage units 20, 30, 40, 50 and 60. The packet stream 10, for example, can comprise of 256 bits wherein each bit represents a bit value. As noted above, filter 5 of FIG. 2 can process data in any data format, including but not limited to a data packet, a data frame, or a data cell.

Filter 5 as shown in FIG. 2 can include a plurality of six storage units 20, 30, 40, 50, 60 and 65 wherein each storage unit 20, 30, 40, 50, 60 and 65 can be any memory storage unit, such as a register. The plurality of storage units 20, 30, 40, 50, 60 and 65 can store programmable values or information therein, and can be of any width or bit length. Furthermore, each storage unit of the plurality of storage units 20, 30, 40, 50, 60 and 65 can be configured to function as discussed above with respect to the storage units 20, 30, 40, 50, 60 and 65 of FIG. 1. In other words, FIG. 2 can include a plurality of storage units 20, a plurality of storage units 30, a plurality of storage units 40, a plurality of storage units 50, a plurality of storage units 60 and a plurality of storage units 65. Accordingly, FIG. 1 illustrates one set of range checking registers having one set of range checking values, BP, BL, PF, SR, ER and FV for implementing one range checking operation on one packet field. In the alternative, FIG. 2 illustrates multiple sets of range checking registers having multiple sets of range checking values BP, BL, PF, SR, ER and FV for implementing a plurality of range checking operations on a plurality of packet fields. The plurality of range checking operations on a plurality of packet fields can occur in parallel because the plurality of storage units 20, 30, 40, 50, 60 and 65 can store a plurality of values for range checking on an incoming packet stream 10.

Figure 3:
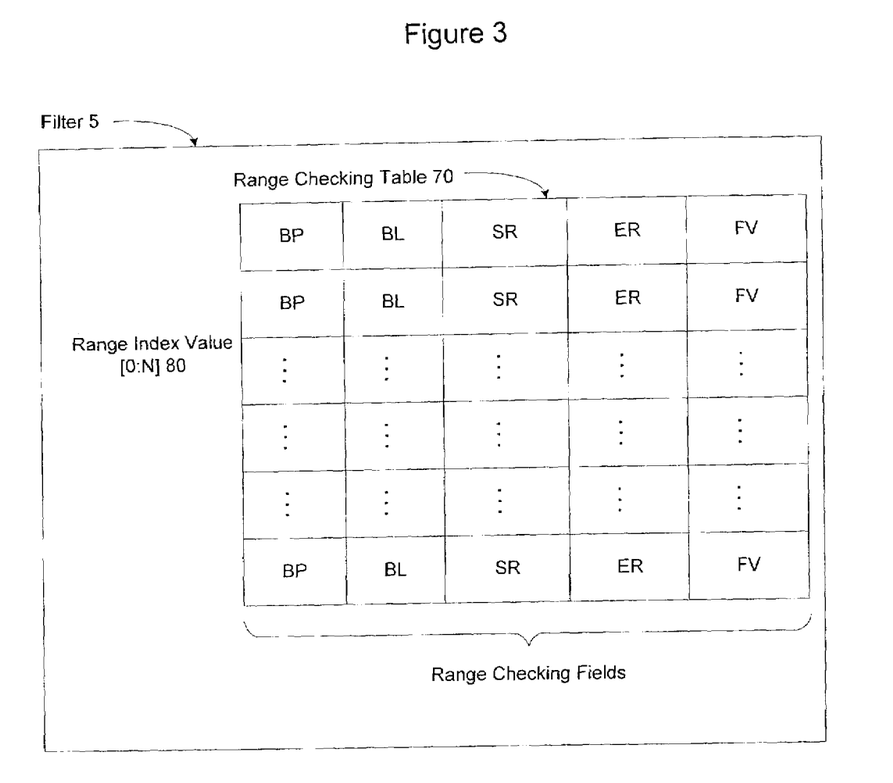
FIG. 3 illustrates one example of a range checking table for filtering a packet according to the present invention.

FIG. 3 shows another example of a hardware configuration that can perform packet filtering based on fast flexible range checking, in accordance with the present invention. The hardware configuration of FIG. 3 can be in an integrated, modular and single chip solution, and therefore can be embodied on a semiconductor substrate, such as silicon. Alternatively, the hardware configuration of FIG. 3 can be a plurality of discrete components on a circuit board.

FIG. 3 illustrates a range checking table 70 that can be configured to table a plurality of storage units. In this embodiment, each storage unit within the range checking table 70 can be a separate and individual storage location or field of the range checking table 70 for storing the range checking fields, such as a bit position value BP, a bit length value BL, a starting range value SR and an ending range value ER, and a fixed value FV. FIG. 3 further shows a range index value 80 that can be generated after a packet stream is parsed or masked. Upon generating the range index value 80, the range index value 80 can be applied or indexed to the range checking table 70 to access and identify the range checking fields therein.

Figure 4:
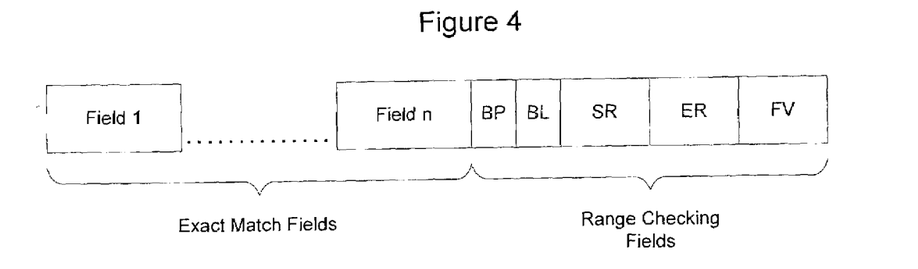
FIG. 4 illustrates another example of a configuration for filtering a packet according to the present invention.

FIG. 4 shows yet another example of a hardware configuration that can perform packet filtering based on fast flexible range checking, in accordance with the present invention. The hardware configuration of FIG. 4 can be in an integrated, modular and single chip solution, and therefore can be embodied on a semiconductor substrate, such as silicon. Alternatively, the hardware configuration of FIG. 4 can be a plurality of discrete components on a circuit board.

FIG. 4 illustrates a string of registers indicated as fields 1-n. The string of registers comprises a plurality of exact match registers for multi-field exact match checking, and a plurality of registers for range checking. The plurality of exact match registers can store exact match fields for implementing multi-field exact match checking. In addition, the plurality of range checking registers can store range checking fields for implementing range checking as discussed herein. In other words, FIG. 4 shows an example of the present invention whereby a set of range checking fields can be configured as a set of extension registers added to the exact match registers.

Figure 5:
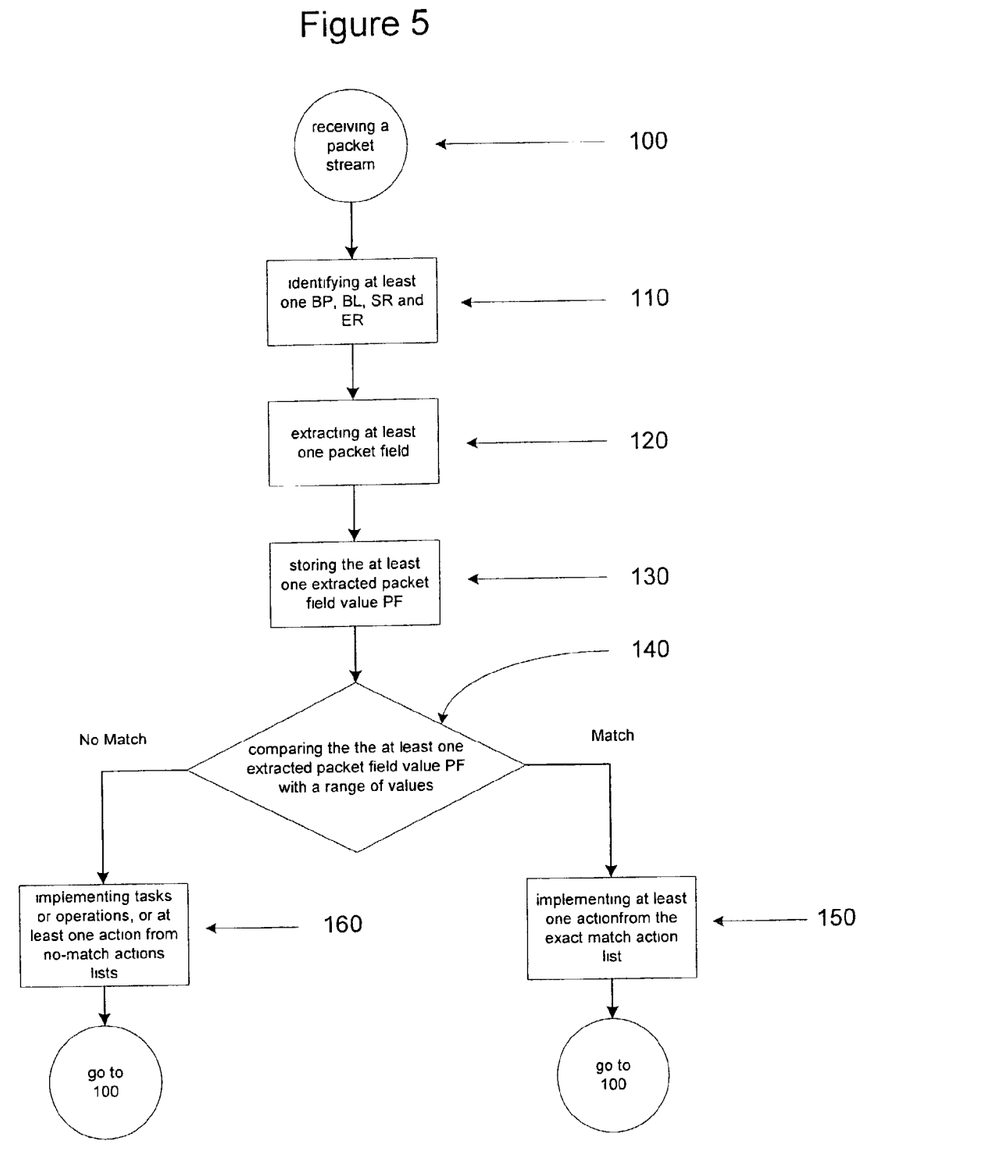
FIG. 5 illustrates a flow chart illustrating one example of a method of filtering a packet according to the present invention.

FIG. 5 illustrates one example of a method of filtering incoming packets in accordance with the present invention. The method of the present example can be implemented in hardware, or software, or a combination of both hardware and software.

An ingress port in a network device can receive at least one packet stream 10 therein. A packet stream 10 can be of any length. In this example, the packet stream 10 can be a bit length of 256 bits starting at bit 0 and ending at bit 255, as shown in FIG. 1. Accordingly, step 100 of FIG. 5 can receives a packet stream in an ingress port of a network device.

As mentioned above, a filter 5 can include a plurality of storage units, such as storage units 20, 30, 40, 50 and 60, or include multiple sets of a plurality of storage units 20, 30, 40, 50 and 60. In this example, the storage units can be a plurality of registers and can store values or information therein, or multiple sets of values or information therein. As for storage units 20, 30, 50 and 60, each storage unit thereof can store preprogrammed values therein. Accordingly, step 110 of FIG. 5 can identify at least four separate values stored in at least four separate storage units, respectively. Step 110 identifies at least one bit position value BP stored in storage unit 20, identifies at least one bit length value BL stored in storage unit 30, identifies at least one starting range value SR stored in storage unit 50, and identifies at least one ending range value ER stored in storage unit 60.

Having identified the at least one bit position value BP and at least one bit length value BL from step 110, the present example at step 120 can extract at least one packet field from the packet stream 10 based on the information corresponding to the bit position value BP and the bit length value BL. For example, suppose the at least one storage unit 20 can store a preprogrammed decimal bit position value of 118; and suppose the at least one storage unit 30 can store a preprogrammed decimal bit length value of 16. Step 110 of FIG. 5 therefore can identify these two values BP and BL; and with these two values, step 120 can extract a packet field of 16 bits in length starting at bit position 118 within packet stream 10.

Upon extracting at least one packet field at step 120 of FIG. 5, at least one extracted packet field value PF can be determined based on the at least one extracted packet field, and the at least one extracted packet field value PF can be temporarily stored in storage unit 40 in step 130. For example, suppose the at least one extracted packet field is determined to have an extracted packet field decimal value of 68. This decimal value of 68 can be temporarily stored in storage unit 40 at step 130.

As mentioned above, at step 110, the present example can identify at least one starting range value SR and at least one ending range value ER. The at least one starting range value SR and the at least one ending range value ER can therefore identify a lower boundary value and an upper boundary value of a set of range of values. At step 140, the present example can compare at least one extracted packet field value PF with or against at least one set of range of values set by the starting range value SR and by an ending range value ER. For instance, suppose at least one storage unit 50 can store a preprogrammed decimal starting range value of 60; and suppose at least one storage unit 60 can store a preprogrammed decimal ending range value of 80. Accordingly, the at least one set of range of values is set by a lower boundary 60 and an upper boundary 80. Step 140 of FIG. 5 can therefore compare an extracted packet field decimal value PF of 68 temporarily stored within storage unit 40 with or against the range of values between 60 and 80.

Upon comparing at least one extracted packet field value PF with or against at least one set of range of values set by a starting range value SR and with an ending range value ER, step 140 can further decide whether the at least one extracted packet field value PF is either within the at least one set of range of values, including the starting and ending range values SR and ER, or whether the at least one extracted packet value PF is outside the at least one set of range of values. If the at least one extracted packet field value PF is within the at least one set of range of values, then present invention determines that there is a match. However, if the at least one extracted packet field value PF is outside the at least one set of range of values, then the present invention determines that there is no match.

If the at least one extracted packet field value PF is within the at least one set of range of values set by the starting range value SR and the ending range value ER, then the present example can proceed to step 150 where an action implementation unit 90 can implement at least one action from a plurality of possible exact match actions with respect to the packet stream 10. If however the at least one extracted packet field value 45 is outside the at least one set of range of values, then the present example can proceed to step 160 where a plurality of tasks or operations or at least one action from a plurality of possible no-match actions can be implemented or performed on the packet stream 10.

Therefore, upon comparing the extracted packet field value PF of 68 with or against the range of values from 60 to 80, including the lower boundary value of 60 and including the upper boundary of 80, step 140 can determine that the extracted packet field value of 68 is within the range of values between 60 through 80, and therefore it is determined that there is a match. Since there is a match, step 150 of the present invention can implement at least one action from a plurality of possible exact match actions with respect to the packet stream 10. In the alternative, suppose the extracted packet field value PF is 49 rather than the value 68. Then step 140 can determine that the extracted packet field value PF of 49 is outside the range of values between 60 through 80, and therefore it is determined that there is no match. Upon this determination, the present invention proceeds to step 160 and can perform a plurality of tasks or at least one action from a plurality of possible no-match actions with respect to the packet stream 10.

It is noted that the specific examples provided herein are examples of the present invention, and is not provided to limit the scope and nature thereof in any manner or way.

Figure 6:
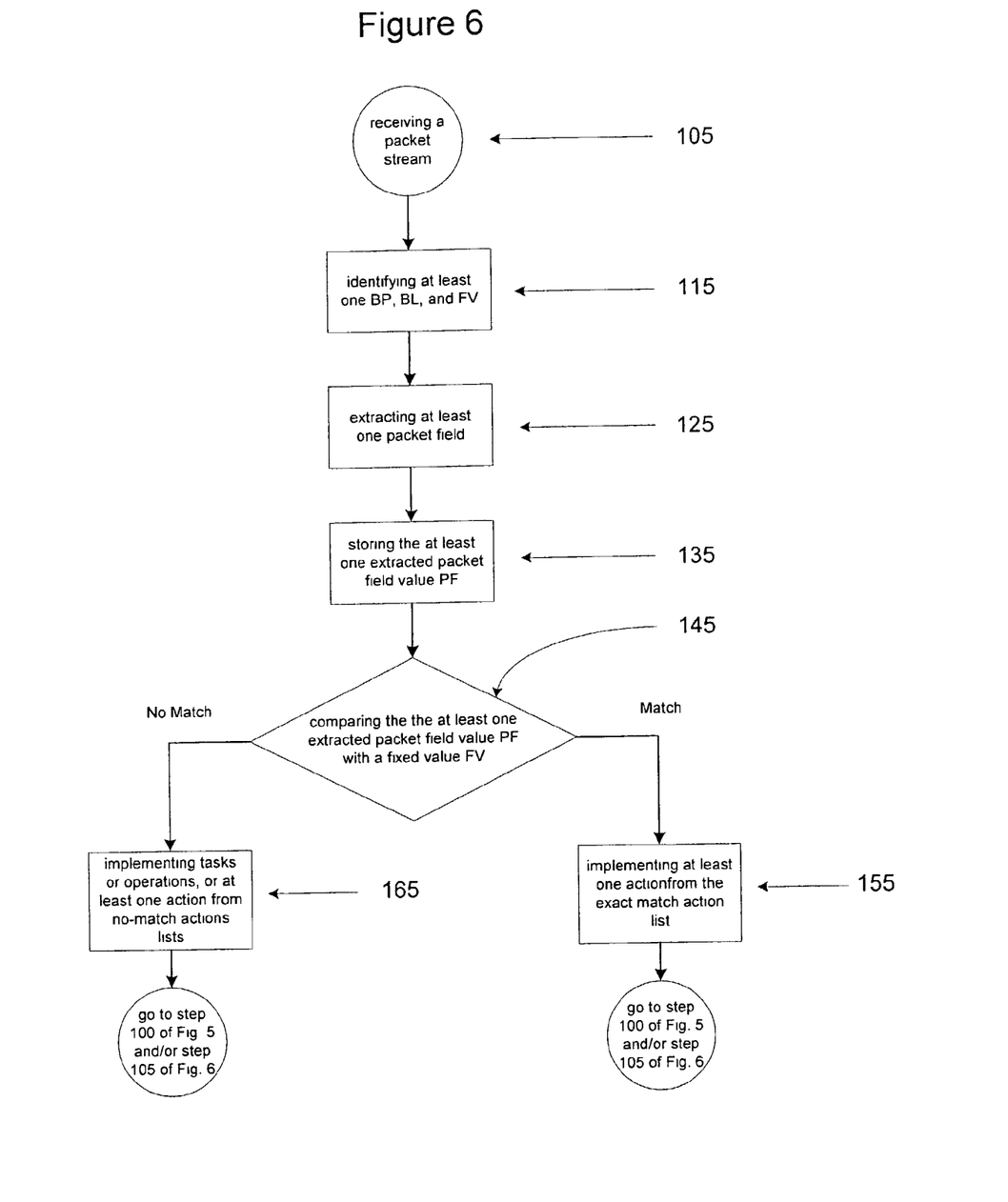
FIG. 6 illustrates another flow chart illustrating another example of a method of filtering a packet according to the present invention.

FIG. 6 illustrates another example of a method of filtering incoming packets in accordance with the present invention. The method of this example can be implemented in hardware, or software, or a combination of both hardware and software.

Step 105 of FIG. 6 can receives a packet stream 10 in an ingress port of a network device. The packet stream 10 can be of any length. In this example, the packet stream 10 can be a bit length of 256 bits starting at bit 0 and ending at bit 255, as shown in FIG. 1.

As mentioned above, a filter 5 can also include a plurality of storage units, such as storage units 20, 30, 40, and 65, or include multiple sets of a plurality of storage units 65. In this example, the storage units can be a plurality of registers and can store values or information therein, or multiple sets of values or information therein. As for storage units 20, 30 and 65, each storage unit thereof can store preprogrammed values therein. Accordingly, step 115 of FIG. 6 can identify at least three separate values stored in at least three separate storage units, respectively. Step 115 identifies at least one bit position value BP stored in storage unit 20, identifies at least one bit length value BL stored in storage unit 30, identifies at least one fixed value FV stored in storage unit 60.

Having identified the at least one bit position value BP and at least one bit length value BL from step 115, the present example at step 125 can extract at least one packet field from the packet stream 10 based on the information corresponding to the bit position value BP and the bit length value BL. For example, suppose the at least one storage unit 20 can store a preprogrammed decimal bit position value of 118; and suppose the at least one storage unit 30 can store a preprogrammed decimal bit length value of 16. Step 115 of FIG. 6 therefore can identify these two values BP and BL; and with these two values, step 125 can extract a packet field of 16 bits in length starting at bit position 118 within packet stream 10.

Upon extracting at least one packet field at step 125 of FIG. 6, at least one extracted packet field value PF can be determined based on the at least one extracted packet field, and the at least one extracted packet field value PF can be temporarily stored in storage unit 40 in step 135. For example, suppose the at least one extracted packet field is determined to have an extracted packet field decimal value of 68. This decimal value of 68 can be temporarily stored in storage unit 40 at step 135.

As mentioned above, at step 115, the present example can identify at least one fixed value FV stored within storage unit 65. At step 145, the present example can compare at least one extracted packet field value PF with or against at least one fixed value FV. For instance, suppose the at least one fixed value FV has a fixed value of 68, then step 145 of FIG. 6 can therefore compare an extracted packet field decimal value PF of 68 temporarily stored within storage unit 40 with or against the fixed value of 68.

Upon comparing at least one extracted packet field value PF with or against at least one fixed value FV, step 145 can further decide whether the at least one extracted packet field value PF is either equal to the at least one fixed value FV, thereby having a match, or whether the at least one extracted packet value PF is not equal to the at least one fixed value FV, thereby having a no-match. If the at least one extracted packet field value PF is equal to the at least one fixed value FV, then present invention determines that there is a match. However, if the at least one extracted packet field value PF is not equal to the at least one fixed value FV, then the present invention determines that there is no match.

If the at least one extracted packet field value PF is equal to the at least one fixed value FV, then the present example can proceed to step 155 where an action implementation unit 90 can implement at least one action from a plurality of possible exact match actions with respect to the packet stream 10. If however the at least one extracted packet field value 45 is not equal to the at least one fixed value FV, then the present example can proceed to step 165 where a plurality of tasks or operations or at least one action from a plurality of possible no-match actions can be implemented or performed on the packet stream 10.

It is noted that the examples provided in FIGS. 5 and 6 in accordance with the present invention can be separately implemented or can be implemented together or in any combination thereof.

Figure 7:
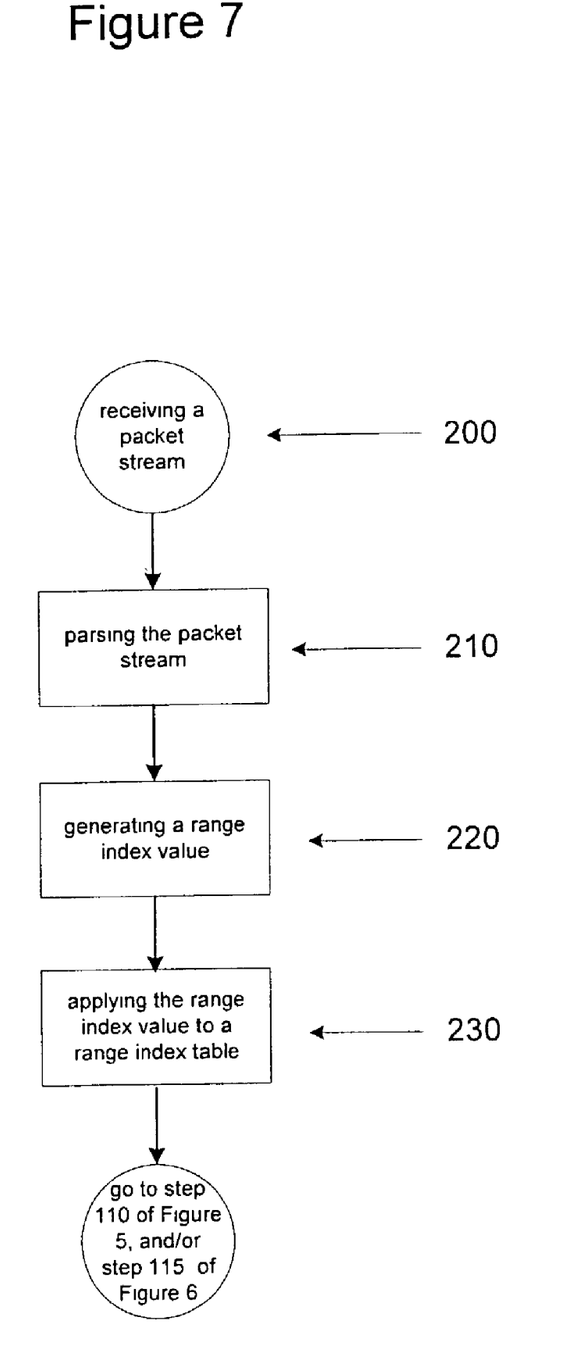
FIG. 7 illustrates another flow chart illustrating another example of a method of filtering a packet according to the present invention.

FIG. 7 illustrates another example of a method of filtering incoming packets in accordance with the present invention. The method of this example can be implemented in hardware, or software, or a combination of both hardware and software.

Step 200 of FIG. 7 can receive a packet stream 10 in a filter 5, and the packet stream 10 can be of any length. In this example, the packet stream 10 can be a bit length of 256 bits starting from bit 0 and ending at bit 255.

Upon receiving the packet stream 10, the present example at step 210 can parse the packet stream based on preprogrammed instructions. Afterwards, step 220 can generate a range index value 80. The range index value 80 can be a binary value or can be of any value format. Once the range index value 80 is generated, then the present example at step 230 can apply or index the range index value 80 to a range checking table 70 wherein the range checking table 70 can include a plurality of range checking fields, such as bit position value BP, bit length value BL, starting range value SR and ending range value ER, and a fixed value FV. Upon applying or indexing the range index value 80 to the range checking table 70, the method step 110 of FIG. 5 can identify at least one bit position value BP, at least one bit length value BL, at least a starting range value SR and at least an ending range value ER within the range checking table 70. In addition or in the alternative, upon applying or indexing the range index value 80 to the range checking table 70, the method step 115 of FIG. 6 can identify at least one bit position value BP, at least one bit length value BL, and a fixed value FV within the range checking table 70. Thereafter, FIG. 7 follows the method steps as discussed above with respect to range checking steps 120, 130, 140, 150 and 160 of FIG. 5, and/or steps 125, 135, 145, 155 and 165 of FIG. 6.

Although the invention has been described based upon these preferred embodiments and examples, it is noted that the method of and a filter for processing a packet based on fast flexible range checking in accordance with the present invention can be flexible in the manner of implementation. For example, the method of and a filter for processing a packet based on fast flexible range checking can be implemented as soon as a packet stream 10 arrives in a network device or filter, or can be implemented as a packet stream 10 is being parsed, or can be implemented after the packet stream 10 is parsed, or can be implemented when the packet stream 10 is made available after some processing and modifications thereto, or can be combined with multi-field exact match checking, wherein a set of range checking fields can be combined as a set of extension registers to a set of exact match registers.

The above-disclosed configurations of the present invention can be in an integrated, modular, and single chip solution and can be embodied on a semiconductor substrate, such as silicon. Furthermore, the methods of filtering a packet as disclosed herein can be implemented in hardware, or software, or a combination of both hardware and software. Additionally, a person of skill in the art with respect to semiconductor design and manufacturing would be able to implement the various elements and methods of the present invention onto a single semiconductor substrate, based upon the architectural description discussed above.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method of processing a packet in a communication network, said method comprising:
    determining at least one packet field value within the packet;
    identifying at least one set of a plurality of range values;
    comparing the at least one packet field value with the at least one set of the plurality of range values; and
    generating a range index value with respect to the packet;
    applying the range index value to a range checking table; and
    implementing at least one action when the at least one packet field value is within the at least one set of the plurality of range values.

2. The method of claim 1, further comprising:
    identifying at least one packet field within the packet; and
    extracting the at least one packet field from the packet.

3. The method of claim 2, wherein the identifying of the packet field comprises:
    identifying at least one first value, wherein the at least one first value represents a bit position within the packet; and
    identifying at least one second value, wherein the at least one second value represents a bit length of the at least one packet field within the packet.

4. The method of claim 3, wherein the extracting of the packet field comprises:
    extracting the at least one packet field, wherein the at least one packet field begins at the bit position and ends at an ending position, wherein the ending position is a sum of the first value and the second value.

5. The method of claim 4, wherein the determining of the at least one packet field value comprises:
    determining the at least one packet field value based on the at least one packet field.

6. The method of claim 1, wherein the identifying of the at least one set of the plurality of range values comprises:
    identifying a starting range value and an ending range value.

7. The method of claim 6, wherein the implementing comprises:
    implementing the at least one action when the at least one packet field value is greater than or equal to the starting range value, and the least one packet field is less than or equal to the ending range value.

8. The method of claim 1, further comprises:
    identifying at least one fixed value;
    comparing the at least one packet field value with the at least one fixed value; and
    implementing at least one action when the at least one packet field value is equal to the at least one fixed value.

9. A network component for processing a packet, said network component comprising:
    at least one first storage unit configured to store a packet field value selected from within the packet;
    at least one second storage unit configured to store at least one set of a plurality of range values;
    a range checking table configured to have a range index value applied thereto, wherein the range checking table is configured to store the at least one second storage unit; and
    an action implementation unit configured to implement at least one action when the packet field value is within the at least one set of the plurality of range values.

10. The network component of claim 9, further comprising:
    at least one third storage unit configured to store a first value, wherein the first value represents a bit position within the packet; and
    at least one fourth storage unit configured to store a second value, wherein the second value represents a bit length of a packet field within the packet.

11. The network component of claim 10, wherein the at least one first storage unit is configured to store the packet field value based on the packet field, wherein the packet field is extracted from the packet.

12. The network component of claim 11, wherein the at least one first storage unit is configured to store the packet field value based on the packet field, wherein the packet field begins at the bit position and ends at an ending position, wherein the ending position is the sum of the first value and the second value.

13. The network component of claim 10, wherein the range checking table is configured to store the at least one third storage unit and the at least one fourth storage unit.

14. The network component of claim 13, wherein the at least one second storage unit is configured to store a starting range value and an ending range value.

15. The network component of claim 9, wherein the at least one second storage unit is configured to store a starting range value and an ending range value.

16. The network component of claim 15, wherein the action implementation unit is configured to implement the at least one action when the packet field value is greater than or equal to the starting range value, and the packet field value is less than or equal to the ending range value.

17. The network component of claim 9, further comprising:
at least one third storage unit configured to store a fixed value, wherein the action implementation unit is configured to implement at least one action when the packet field value is equal to the fixed value.

18. A system for processing a packet in a communication network, said system comprising:
a means for determining at least one packet field value within the packet;
a means for identifying at least one set of a plurality of range values;
a means for comparing the at least one packet field value with the at least one set of the plurality of range values; and
a means for generating a range index value with respect to the packet;
a means for applying the range index value to a range checking table; and
a means for implementing at least one action when the at least one packet field value is within the at least one set of the plurality of range values.

19. The system of claim 18, further comprising:
a means for identifying at least one packet field within the packet; and
a means for extracting the at least one packet field from the packet.

20. The system of claim 19, wherein the means for identifying the at least one packet field identifies a first value, wherein the first value represents a bit position within the packet, and
wherein the means for identifying the at least one packet field identifies a second value, wherein the second value represents a bit length of the at least one packet field within the packet.

21. The system of claim 20, wherein the means for extracting the at least one packet field extracts the at least one packet field, wherein the at least one packet field begins at the bit position and ends at an ending position, and wherein the ending position is the sum of the first value and the second value.

22. The system of claim 21, wherein the means for determining the at least one packet field value determines the at least one packet field value based on the at least one packet field.

23. The system of claim 18, wherein the means for identifying the at least one set of the plurality of range values identifies a starting range value and an ending range value.

24. The system of claim 23, wherein the means for implementing implements the at least one action when the at least one packet field value is greater than or equal to the starting range value, and the at least one packet field value is less than or equal to the ending range value.

25. The system of claim 18, further comprising:
a means for identifying at least one fixed value;
a means for comparing the at least one packet field value with the at least one fixed value; and
a means for implementing at least one action when the at least one packet field value is equal to the at least one fixed value.

* * * * *